(12) United States Patent
Lebel (10) Patent No.: US 10,094,564 B2
(45) Date of Patent: Oct. 9, 2018

(54) COMBUSTOR DILUTION HOLE COOLING SYSTEM

(71) Applicant: PRATT & WHITNEY CANADA CORP., Longueuil (CA)

(72) Inventor: Larry Lebel, Vercheres (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 256 days.

(21) Appl. No.: 14/689,495

(22) Filed: Apr. 17, 2015

(65) Prior Publication Data

US 2016/0305663 A1 Oct. 20, 2016

(51) Int. Cl.
*F23R 3/06* (2006.01)
*F23R 3/00* (2006.01)

(52) U.S. Cl.
CPC ........... *F23R 3/06* (2013.01); *F23R 3/002* (2013.01); *F23R 2900/03041* (2013.01); *F23R 2900/03044* (2013.01)

(58) Field of Classification Search
CPC .. F23R 3/002; F23R 3/06; F23R 3/346; F23R 2900/03041–2900/03045; F02C 7/18; F02C 7/24; F05D 2260/201; F05D 2260/202
See application file for complete search history.

(56) References Cited

U.S. PATENT DOCUMENTS

| | | | | |
|---|---|---|---|---|
| 4,132,066 A * | 1/1979 | Austin, Jr. | ........... | F23R 3/06 60/752 |
| 4,302,941 A * | 12/1981 | Dubell | ............... | F23R 3/08 60/755 |
| 4,361,010 A | 11/1982 | Tanrikut et al. | | |
| 4,695,247 A * | 9/1987 | Enzaki | ............. | F23R 3/002 431/351 |
| 5,435,139 A * | 7/1995 | Pidcock | .............. | F23R 3/002 60/752 |
| 5,687,572 A | 11/1997 | Schrantz et al. | | |
| 6,408,628 B1 * | 6/2002 | Pidcock | .............. | F23R 3/002 60/752 |
| 7,059,133 B2 | 6/2006 | Gerendas | | |
| 2001/0004835 A1 * | 6/2001 | Alkabie | .............. | F23R 3/002 60/757 |

(Continued)

FOREIGN PATENT DOCUMENTS

GB 2017827 A * 10/1979 ............. F23R 3/002

*Primary Examiner* — Gerald L Sung
*Assistant Examiner* — Rene Ford
(74) *Attorney, Agent, or Firm* — Norton Rose Fulbright Canada LLP (57) ABSTRACT

A combustor for a gas turbine engine including a combustor shell, a heat shield mounted to the combustor shell spaced-apart from the combustor shell to define an air gap therebetween, a core dilution passageway extending through the combustor shell and the heat shield, and a sub-chamber disposed within the air gap in fluid communication with the core dilution passageway. The sub-chamber is separated from a remainder of the air gap by at least one intermediate rail projecting across the air gap and forming an outer boundary of a peripheral area of the core dilution passageway. Impingement holes are formed through the combustor shell and in fluid communication with the sub-chamber. A method of cooling an area surrounding a dilution hole in a combustor is also presented.

17 Claims, 5 Drawing Sheets

(56) References Cited

U.S. PATENT DOCUMENTS

| | | | |
|---|---|---|---|
| 2006/0207259 A1* | 9/2006 | Holt | F23M 5/085 |
| | | | 60/772 |
| 2008/0264064 A1* | 10/2008 | Sze | F23R 3/002 |
| | | | 60/752 |
| 2011/0030378 A1* | 2/2011 | Carlisle | F23R 3/002 |
| | | | 60/753 |
| 2013/0019603 A1* | 1/2013 | Dierberger | F23R 3/002 |
| | | | 60/772 |
| 2014/0033723 A1* | 2/2014 | Doerr | F23R 3/007 |
| | | | 60/737 |
| 2015/0135719 A1* | 5/2015 | Gerendas | F23R 3/002 |
| | | | 60/752 |

\* cited by examiner

COMBUSTOR DILUTION HOLE COOLING SYSTEM

TECHNICAL FIELD

The application relates generally to gas turbine engines and, more particularly, to combustors.

BACKGROUND OF THE ART

In a gas turbine engine, the combustor includes a combustor shell which defines the combustion chamber where the gas are ignited and the combustion takes place. The combustor shell may include one or more row of apertures, known as dilution holes, which allow a portion of the air from outside of the combustor shell to enter the combustion chamber and mix with the ignited gases. The flow of air going through the dilution holes, known as dilution flow, is taken from an external air supply cavity or plenum, and flows directly into the combustion chamber through the dilution holes. The combustor shell is typically lined with heat shields for protecting the combustor shell from the high temperatures generated by the combustion. The heat shields may be cooled using impingement jets formed by impingement holes in the combustor shell. Effusion holes may also be defined in the heat shields to further cool same. The dilution flow is independent and separate from the flow of cooling air passing through the impingement holes and effusion holes.

The areas surrounding the dilution holes may develop hot spots due to lack of cooling air and main stream, high heat load secondary flow structures. Accordingly, there is a need for an improved cooling scheme to provide cooling to the surrounding area of the dilution holes.

SUMMARY

In one aspect, there is provided a combustor for a gas turbine engine, comprising: a combustor shell; a heat shield mounted to the combustor shell spaced-apart from the combustor shell to define an air gap therebetween; a core dilution passageway extending through the combustor shell and the heat shield; a sub-chamber disposed within the air gap in fluid communication with the core dilution passageway, the sub-chamber being separated from a remainder of the air gap by at least one intermediate rail projecting across the air gap and forming an outer boundary of a peripheral area of the core dilution passageway; and impingement holes formed through the combustor shell and in fluid communication with the sub-chamber.

In another aspect, there is provided gas turbine engine, comprising: a combustor including: a combustor shell; a heat shield mounted to the combustor shell spaced-apart from the combustor shell to define an air gap therebetween, the combustor shell including impingement holes configured to provide impingement jets onto the heat shield; a first dilution hole defined in the combustor shell in registry with a corresponding second dilution hole defined in the heat shield, the first dilution hole and the second dilution hole defining a core dilution passageway; and the second dilution hole having a boss at its rim, spaced apart from the combustor shell, such that the gap fluidly communicates with the core dilution passageway.

In another aspect, there is provided a method of cooling an area surrounding a dilution hole in a combustor, the combustor having a heat shield spaced-apartedly mounted to a combustor shell to define an air gap, the method comprising: flowing a peripheral dilution flow through the combustor shell to a sub-chamber that is pressurised in relation to a remainder of the air gap and around a boss formed at a rim of the dilution hole, the sub-chamber extending within a peripheral area of the dilution hole, the peripheral dilution flow accounting for at least 5% of a total dilution flow; and merging the peripheral dilution flow with a core dilution flow of the dilution hole to form the total dilution flow.

DESCRIPTION OF THE DRAWINGS

Reference is now made to the accompanying figures in which.

DETAILED DESCRIPTION

Figure 1:
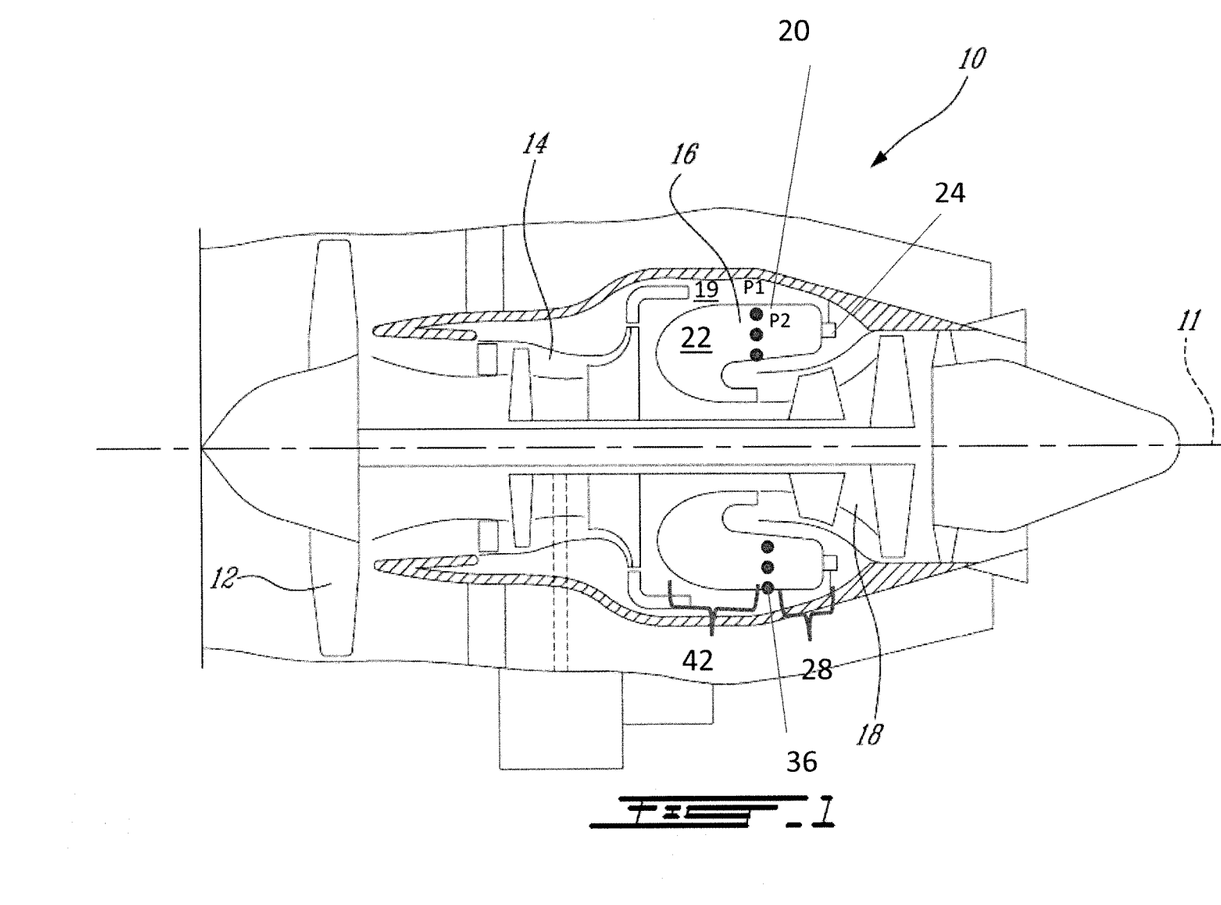
FIG. 1 is a schematic cross-sectional view of a gas turbine engine.

FIG. 1 illustrates a gas turbine engine 10 of a type preferably provided for use in subsonic flight, generally comprising in serial flow communication along a central axis 11 defining an axial direction: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
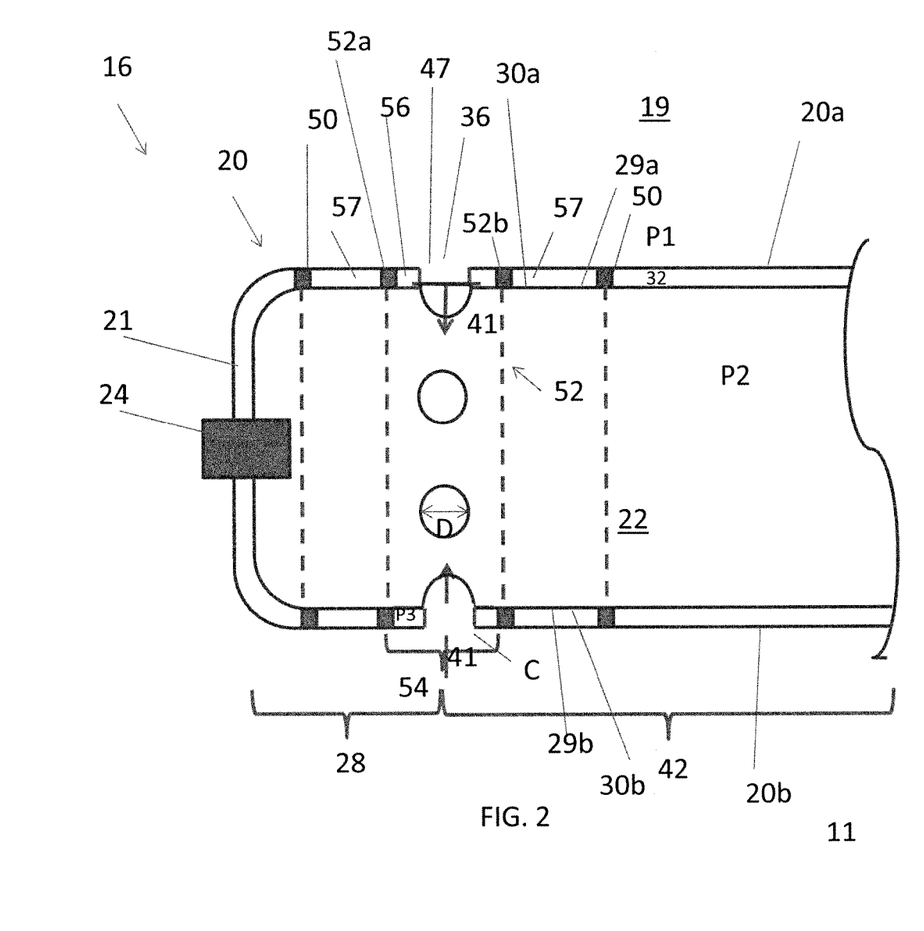
FIG. 2 is a schematic cross-sectional view of an upstream end portion of a combustor for a gas turbine engine, such as the gas turbine engine of FIG. 1.

The combustor 16 is housed in an air supply cavity 19 or plenum supplied with compressed air from compressor 14. The combustor 16 includes an annular shell assembly 20 defining a combustion chamber 22 where the gases are ignited and the combustion takes place. As shown in FIG. 2, the shell assembly 20 includes a radially outer combustor shell 20a and a radially inner combustor shell 20b extending axially from an annular inlet dome portion 21 to which a circumferential array of fuel nozzles 24 are mounted for injecting a fuel mixture into a primary zone 28 of the combustion chamber 22. The outer and inner combustor shells 20a, 20b are provided on an inner side thereof with heat shields. A heat shield 30a is mounted to the outer combustor shell 20a and a heat shield 30b is mounted to the inner combustor shell 20b inside the combustion chamber 22. Each heat shield is circumferentially segmented into a plurality of heat shield panels, as known in the art. It is also understood that each heat shield may comprise more than one circumferential row of panels along the axial length of the combustor shell. The heat shields 30a, 30b protect the outer and inner combustor shells 20a, 20b from the high temperatures generated by the combustion in the combustion chamber 22. A cooling air gap 32 is provided between the heat shields 30a, 30b and the outer and inner combustor shells 20a, 20b. Impingement holes 34, 35 (shown in FIG. 4) are defined in the outer and inner combustor shells 20a, 20b for directing impingement jets through the air gap 32 against respective back faces 29a, 29b of the heat shields 30a, 30b. In one embodiment, the air gap 32 forms a chamber.

The combustor shell assembly 20 includes at least one row of dilution holes 36 extending through the outer and inner combustor shells 20a, 20b and the heat shields 30a, 30b disposed circumferentially spaced-apart. The dilution holes 36 fluidly communicate with the air supply cavity 19 surrounding the combustor 16 and form a core dilution passageway 39 (shown in FIG. 4) for a core dilution flow 41 (shown in FIGS. 2 and 4) from the air supply cavity 19 to the combustion chamber 22. The combustion chamber 22 is at a pressure P2 lower than a pressure P1 of the air supply cavity 19, which enables the flow of air through the dilution holes 36 toward the region of lower pressure P2. The dilution holes 36 are disposed between the primary zone 28 and a secondary zone 42 of the combustor 16. The secondary zone 42 is disposed downstream from the primary zone 28. In the embodiment shown in FIG. 1, the combustor 16 includes only one row of dilution holes 36 (i.e. all the dilution holes 36 have a same axial coordinate). It is however contemplated that the dilution holes 36 could be disposed in more than one axial row. In one embodiment, the dilution holes 36 are circular. The dilution holes 36 may however have various shapes.

Rails extend from the back faces 29a, 29b of the heat shields 30a, 30b across the air gap 32. The rails form flow barriers in the air gap 32 to direct the flow of cooling air to targeted areas after having impinged upon the back faces of the heat shields. Some of the rails may extend in substantial sealing engagement with the outer combustor shell 20a and the inner combustor shell 20b to compartmentalized the air gap 32 into sub-regions. For instance, the rails may include end rails 50 disposed at axial extremities of the heat shields 30a, 30b for sealing engagement with the combustor shells 20a, 20b. The end rails 50 may define a closed perimeter at the back of each heat shield segment. The rails may further include one or more intermediate rails 52 at a periphery of the dilution holes 36. The rails are outer boundaries of a peripheral area 54 of the dilution holes 36 which separate a portion of the gap 32 at the peripheral area 54 from a remainder of the gap 32. In the embodiment shown in FIG. 2, the row of dilution holes 36 is disposed between a pair of intermediate rails 52, the intermediate rails substantially fluidly isolating (possible presence of a leakage flow 58, shown in FIG. 4) the portion of the gap 32 at the peripheral area 54 of the dilution holes 36 from the rest of the gap 32. According to one embodiment, the intermediate rails 52 may extend across the gap 32 in sealing engagement with the combustor shell 20a, thereby substantially sealing the area surrounding the dilution holes 36 (i.e. the peripheral area 54) from the remainder of the gap 32. Should there be more than one row of dilution holes 36, intermediate rails 52 would be disposed between the rows such that, in one embodiment, the intermediate rails 52 may fluidly isolate axially the rows of dilution holes 36 from one another.

The portion of the gap 32 at the peripheral area 54 of the dilution holes 36 delimited by the intermediate rails 52 forms a pressured sub-chamber 56 around the dilution holes 36. The intermediate rails 52 form axially opposed outer ends of the sub-chamber 56. In this embodiment, the sub-chamber 56 is annular. As will be seen hereinafter, the pressured sub-chamber 56 is part of a peripheral dilution passageway 55 (shown in FIG. 4) which delivers an annular peripheral dilution flow 59 (shown in FIG. 4) to the combustion chamber 22. The peripheral dilution flow 59 is cooling air around the dilution holes 36 which combined with the core dilution flow 41 passing through the dilution holes 36 forms the total dilution flow discharged in the combustion chamber 22. While flowing over the area bordering the portion of the dilution holes 36 extending through the heat shields 30a, 30b, the air picks up heat, thereby cooling down this dilution hole surrounding area (e.g. boss). This provides for better cooling of the dilution holes areas of the heat shields 30a, 30b. The sub-chamber 56 is at a pressure P3 intermediate to the pressures P1 and P2. The pressure P3 may be higher than a pressure P4 of an adjacent sub-chamber 57 defined by the portion of the gap 32 axially between the end rails 50 and the intermediate rails 52. The sub-chamber 57 may be adjacent and may surround the sub-chamber 56, as in the example shown in FIG. 3, or may be just adjacent to the sub-chamber 56, as in the example shown in FIG. 2.

The peripheral area 54 is an immediate surrounding of the dilution holes 36. According to the embodiment shown in FIG. 2, the peripheral area 54 is the area around the dilution holes 36 axially between the intermediate rails 52. According to the embodiment shown in FIG. 3, the peripheral area 54 may be an area inscribed in a disk which outer boundary is defined by a circular intermediate rail 52' concentric to the dilution hole 36. The peripheral area 54 has, in one embodiment, a radius of about between two times to three times a diameter D1 of a combustor shell portion 36a (shown in FIG. 4) of the dilution holes 36. According to one embodiment, the peripheral area 54 is a region around the dilution holes 36 is limited to a minor portion of the heat shield (e.g. less than 50% of the heat shield panel area).

Figure 3:
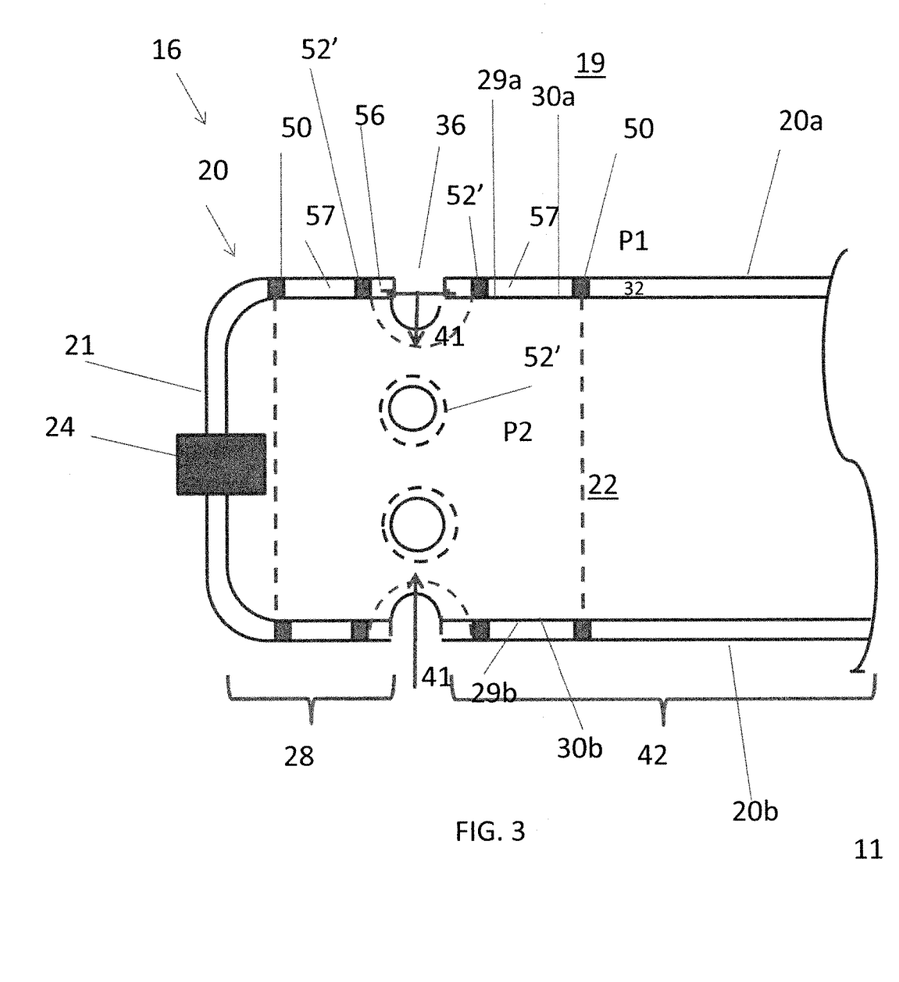
FIG. 3 is a schematic cross-sectional view of upstream end portion of another embodiment of the combustor.

Because the intermediate rails 52 are at the peripheral area 54 of the dilution holes 36, the intermediate rails 52 are disposed axially inwardly of the end rails 50. FIGS. 2 and 3 show different embodiments of the intermediate rails 52 relative to the dilution holes 36. For example, in FIG. 2, two circumferentially extending intermediate rails 52a and 52b are disposed axially on opposed sides of the row of dilution holes 36 to axially isolate the dilution holes 36 from the remainder of the gap 32. It is understood that these rails may be segmented. In another example, in FIG. 3, circular intermediate rails 52' isolate the dilution holes 36 individually.

Figure 4:
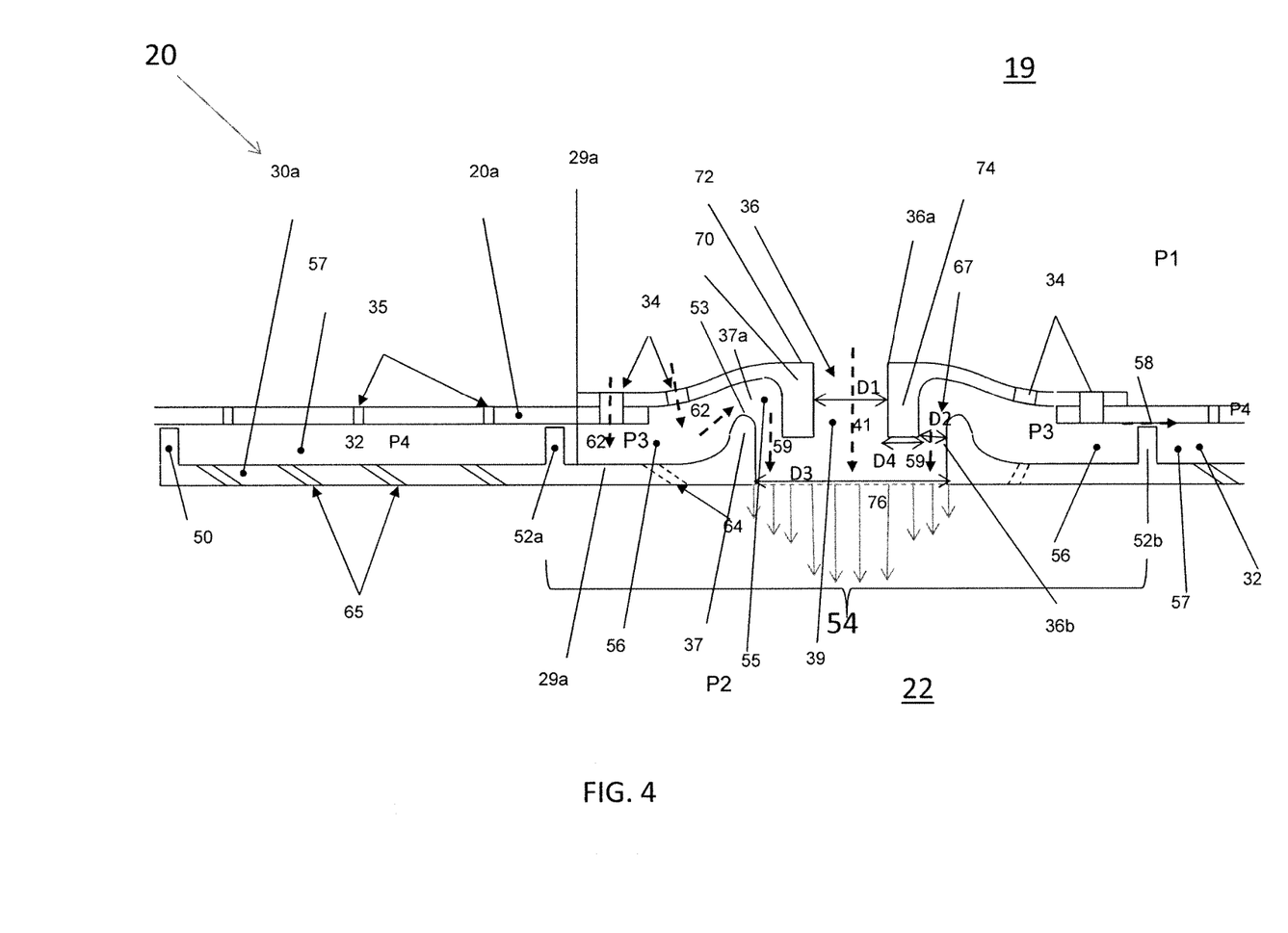
FIG. 4 is a schematic cross-sectional view illustrating the details of a combined cooling and dilution flow arrangement between a heat shield and a radially outer combustor shell of a combustor such as the combustor shown in FIG. 2 or 3.

Turning now to FIG. 4 as exemplified with respect to the outer combustor shell 20a, it can be clearly seen that the dilution holes 36 extend through both the combustor shell 20a and the heat shield 30a. The dilution holes 36 thus include a combustor shell portion 36a made in the combustor shell 20a and a heat shield portion 36b made in the heat shield 30a, the two portions being in registry. In one embodiment, a cross-section (in this example the diameter D1) of the combustor shell portion 36a of the dilution holes 36 is smaller than a cross-section (in this example a diameter D3) of the heat shield portion 36b of the dilution holes 36. The difference in diameters between the combustor shell portion 36a and the heat shield portion 36b provide for the formation of a channel for the peripheral dilution flow 59 (i.e. a boss 37 defined at a rim of the dilution holes 36b is spaced radially inwardly from the combustor shell 20a, thereby forming a gap or space 37a through which a portion of the air in the pressured sub-chamber 56 may escape).

The outer combustor shell 20a has the plurality of sub-chamber impingement holes 34 briefly described above disposed within the peripheral area 54 of the dilution holes 36. The sub-chamber impingement holes 34 are typically of a smaller size and/or density than the dilution holes 36, so that a combined surface area (i.e. the addition of all the cross-sectional areas of the dilution holes 36, which may be provided either at the combustor shell or the heat shield) of the sub-chamber impingement holes 34 is smaller than that of the dilution holes 36. Each impingement hole 34 provides an impingement jet 62 onto the back face 29a of the heat shield 30a to impingement cool this portion of the heat shield 30a. In one embodiment, the sub-chamber impingement holes 34 are axially distributed in rows. The outer combustor shell 20a may include main impingement holes 35 at a portion of the outer combustor shell 20a away from the peripheral area 54 in the sub-chamber 57. The impingement holes 35 may be of smaller size and/or density as the impingement holes 34.

The heat shield 30a may include a plurality of sub-chamber effusion holes 64 (shown in phantom) disposed within the peripheral area 54 of the dilution holes 36. The sub-chamber effusion holes 64 could be omitted. Should the heat shield 30a include sub-chamber effusion holes 64, a combined surface area of the sub-chamber effusion holes 64 may have a smaller size than that of the sub-chamber impingement holes 34 to maintain the pressure P3 in the pressured sub-chamber 56. The smaller the combined surface area of the sub-chamber effusion holes 64, the greater the pressure P3 in the sub-chamber 56 (yet with P3 smaller than P2). The outer combustor shell 20a may include main effusion holes 65 at a portion of the outer combustor shell 20a away from the peripheral area 54 in the sub-chamber 57. The sub-chamber effusion holes 64 and the main effusion holes 65 may be inclined toward the dilution holes 36. The effusion holes 64 may be of smaller size and/or density as the effusion holes 65.

The peripheral dilution flow 59 flowing through the sub-chamber 56 contributes to the overall total dilution flow (core dilution flow 41+surrounding annular peripheral dilution flow 59) entering the combustion chamber 22 via the dilution holes 36. The diameter D3 of the heat shield portion 36b of the dilution holes 36 may thus be calculated to accommodate the peripheral dilution flow 59. As illustrated by the schematic velocity profile in FIG. 4, an annular radius D2 of peripheral dilution flow 59 may be calculated to accommodate the merging of the peripheral dilution flow 59 with the core dilution flow 41 with minimal turbulence. The annular radius D2 may be calculated as follows: D2=(D3−D1−2*D4)/2, where D4 is a thickness of a radially inwardly extending cylindrical wall 74 projecting from the combustor shell portion 36a of the dilution holes 36 into the heat shield portion 36b of the dilution holes 36.

In one embodiment, the annular radius D2 is about 10% of the diameter D1. In one embodiment, the annular radius D2 is about 20% of the diameter D1. In one embodiment, the diameter D2 is about 30% of the diameter D1. In one embodiment, the annular radius D2 is comprised between about 10% and about 30% of the diameter D1. The peripheral dilution flow 59 is not a leakage flow and accounts for at least 5% of the total dilution flow though the dilution holes 36. In one embodiment, the peripheral dilution flow 59 contributes for about 10% of the total dilution flow while the core dilution flow 41 contributes for about 90% of the total dilution flow. In one embodiment, the peripheral dilution flow 59 contributes for about 15% of the total dilution flow, while the core dilution flow 41 contributes for about 85% of the total dilution flow. In one embodiment, the peripheral dilution flow 59 contributes for about 20% of the total dilution flow, while the core dilution flow 41 contributes for about 80% of the total dilution flow. In one embodiment, the peripheral dilution flow 59 contributes for about 25% of the total dilution flow, while the core dilution flow 41 contributes for about 75% of the total dilution flow. In one embodiment, the peripheral dilution flow 59 contributes for about 50% of the total dilution flow, while the core dilution flow 41 contributes for about 70% of the total dilution flow. In one embodiment, the peripheral dilution flow 59 contributes for about at least 10% and at most 50% of the total dilution flow. In one embodiment, the peripheral dilution flow 59 contributes for about at least 10% and at most 20% of the total dilution flow. In one embodiment, the peripheral dilution flow 59 contributes for about at least 20% and at most 30% of the total dilution flow. In one embodiment, the peripheral dilution flow 59 contributes for about at least 30% and at most 40% of the total dilution flow. In one embodiment, the peripheral dilution flow 59 contributes for about at least 40% and at most 50% of the total dilution flow.

In addition, the pressure drop across the peripheral dilution passageway 55 may vary from between 50% and 90% of the pressure drop across the dilution holes 36.

Figure 5:
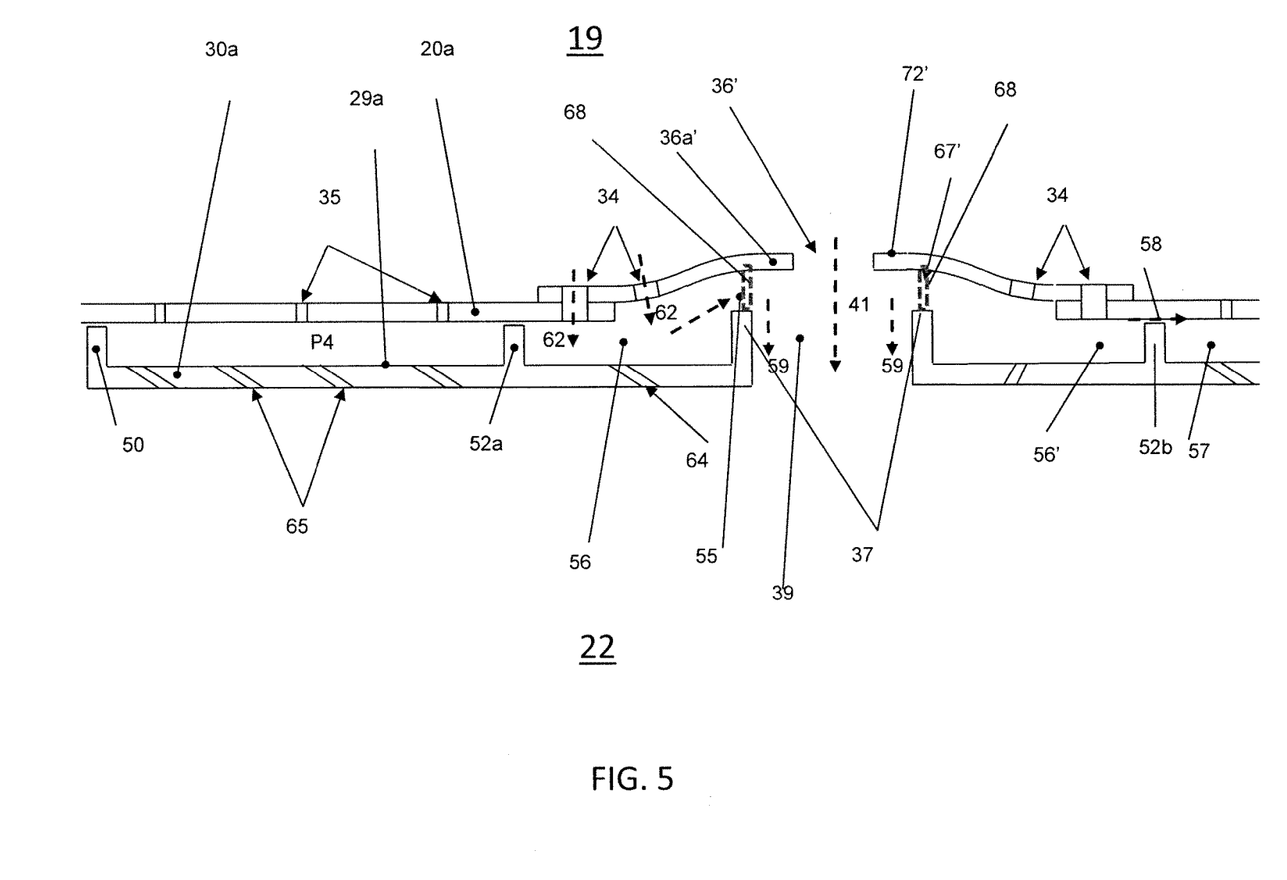
FIG. 5 is a schematic cross-sectional view illustrating the details of another combined cooling and dilution flow arrangement between a heat shield and a radially outer combustor shell of a combustor such as the combustor shown in FIG. 2 or 3.

The peripheral dilution flow 59 may merge at various angles with the core dilution flow 41. An outlet 67 of peripheral dilution flow 59 may disposed at an inner end 53 of the sub-chamber 56 or downstream thereof. The inner end 53 is adjacent to the core passageway 39. FIG. 4 shows an example of an outlet 67 of peripheral dilution flow 59 disposed downstream of the inner end 53 of the sub-chamber 56. FIG. 5 shows an example of an outlet 67' of peripheral dilution flow 59 disposed at the inner end 53 of the sub-chamber 56. The outlet 67 corresponds to a main outlet of the peripheral dilution passageway 55. The outlet 67 is oriented to have a same orientation as the core dilution flow 41 (i.e. merging angle of 0 degrees), as shown in FIG. 4. In an another embodiment shown in FIG. 5, the outlet 67' of the sub-chamber 56 is oriented to face a dilution flow 41' (i.e. merging angle of 90 degrees). Expelling the peripheral dilution flow 59 in a same direction, i.e. as tangential as possible, to the core dilution flow 41 may reduce losses. In addition, a velocity of the peripheral dilution flow 59 being less than a velocity of the core dilution flow 41, and the peripheral dilution flow 59 surrounding the core dilution flow 41 may provide a smoother velocity profile which in turn may minimize secondary vortices compared to a flow made of only the core dilution flow 41. In one embodiment, a plurality of cooling fins could be disposed at the outlet 67 of the peripheral dilution passageway 55. As illustrated in FIG. 5, the outlet 67' of the sub-chamber 56 includes a plurality of fins 68. The peripheral dilution flow 59 would pass through the fins 68 before merging with the core dilution flow 41. The fins 68 may further improve cooling of the edge of the dilution hole 36.

Referring back to FIG. 4, it can be seen that the outer combustor shell 20a may include a curved inwardly facing flow guiding surface 70 at a rim 72 of the dilution holes 36 for reducing turbulence in the peripheral dilution flow 59 exiting the sub-chamber 56. In addition, the dilution hole bosses 37 at the back of the heat shield 30a and facing the flow guiding surface 70 may be rounded to streamline the peripheral dilution flow 59 exiting the sub-chamber 56. As shown in FIG. 4, the flow guiding surface 70 and the dilution boss provide an elbow for guiding the peripheral dilution flow 59 exiting the sub-chamber 56. The curved flow guiding surface 70 may be raised relative to a rest of the outer combustor shell 20a, as shown in FIGS. 4 and 5. Alternatively, it could be flush or leveled with the rest of the combustor shell. The curved flow guiding surface 70 may be integrally formed with the combustor shell or may be part of an added piece defining the combustor shell portion 36a of the dilution holes 36.

The rim 72 of the combustor shell portion 36a of the dilution holes 36 may have the radially inwardly extending cylindrical wall 74 projecting into the gap portion and in some cases into the heat shield portion 36b of the dilution hole to guide the flow 59 leaving the sub-chamber 56 directly into the heat shield portion 36b of the dilution hole 36. The wall 74 may stop before reaching an exit 76 of the core dilution passageway 39 (i.e. before reaching the combustion chamber 22), so that the peripheral dilution flow 59 merges with the core dilution flow 41 before the exit 76 of the dilution holes 36. Alternatively, the radially inwardly extending wall 74 may extend until reaching or even beyond the exit 76 of the dilution holes 36, so that the peripheral dilution flow 59 only merge with the core dilution flow 41 downstream of the exit 76 of the dilution holes 36. The radially inwardly extending wall 74 could also be omitted. FIG. 5 illustrates such an embodiment wherein a rim 72' of a combustor shell portion 36a' of a dilution hole 36' does not have any radially inwardly protruding flow guiding structure.

The proposed assembly of combustor shell assembly provides a dilution jet made of two sources: direct air from the air supply cavity at a core surrounded by a jet of cooling air that has already impinged the heat shield in the vicinity of the dilution holes. While the addition of a second source of flow may increase pressure drop, it may be compensated by the increase of impingement flow around the dilution holes. Net cooling flow may be reduced by recycling heat shield cooling flow into dilution jets, which may in turn improve combustion performance and engine emissions, including emissions of NOx. By allowing impingement air around the dilution holes to flow over the dilution hole bosses of the heat shields, the area surrounding the dilution holes can be better cooled. Also temperature profile of combustion products, both in radial and circumferential directions, may be improved to get better hot end durability. Better mixing and reduced peak gas temperature may result in reduced emissions and better hot end durability.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A combustor for a gas turbine engine, comprising:
a combustor shell which includes a protuberance away from an inner heat shield, the protuberance having a first dilution hole defined therein;
the heat shield mounted to the combustor shell and spaced-apart from the combustor shell to define an air gap therebetween, the heat shield has an outer surface facing the combustor shell and circumferentially surrounding a combustion zone relative to a central axis of the combustor, and an opposite inner surface facing the combustion zone, the heat shield having a second dilution hole defined therein, the second dilution hole is axially and circumferentially aligned with the first dilution hole relative to the central axis, a diameter of the first dilution hole being smaller than a diameter of the second dilution hole, a boss encompassing the second dilution hole and extending from the outer surface of the heat shield to an outer end spaced from the heat shield;
a core dilution passageway extending through the first dilution hole of the combustor shell and the second dilution hole of the heat shield;
a sub-chamber disposed within the air gap in fluid communication with the core dilution passageway, the sub-chamber being separated from a remainder of the air gap by at least one intermediate rail projecting across the air gap and forming an outer boundary of the sub-chamber and of a peripheral area of the core dilution passageway, the boss forming an inner boundary of the of the sub-chamber;
an annular peripheral dilution passageway defined between the combustor shell and the heat shield around the core dilution passageway and extending through the second dilution hole of the heat shield, the sub-chamber having an outlet between the outer end of the boss and the combustor shell protuberance which is upstream of an exit of the second dilution hole relative to a core dilution flow within the core dilution passageway such that a peripheral dilution flow exiting the sub-chamber outlet combines with the core dilution flow of the core dilution passageway to form a total dilution flow upstream of the exit of the second dilution hole relative to the core dilution flow within the core dilution passageway; and
impingement holes formed through the combustor shell and in fluid communication with the sub-chamber and the remainder of the air gap, the impingement holes having at least an impingement jet path directed onto the outer surface of the heat shield within the sub-chamber.

2. The combustor as defined in claim 1, wherein the sub-chamber is in fluid communication with the core dilution passageway via the peripheral dilution passageway, the outlet of the peripheral dilution passageway being concentric with the core dilution passageway.

3. The combustor as defined in claim 1, wherein the sub-chamber is a first sub-chamber; and
further comprising end rails extending across the air gap, the at least one intermediate rail being disposed between the end rails, a second sub-chamber being defined by a portion of the air gap extending between the at least one intermediate rail and the end rails.

4. The combustor as defined in claim 1, wherein the first dilution hole is in registry with the second dilution hole.

5. The combustor as defined in claim 4, wherein an annular width of the peripheral dilution passageway is comprised between 10% and 30% of the diameter of the first dilution hole.

6. The combustor as defined in claim 4, wherein a combined surface area of the impingement holes is smaller than a combined surface area of at least one of the first and second dilution holes.

7. The combustor as defined in claim 1, wherein the peripheral dilution flow is configured to account for between 5% and 50% of the total dilution flow.

8. The combustor as defined in claim 1, wherein the at least one intermediate rail includes two circumferentially extending rails disposed on each side of the core dilution passageway.

9. The combustor as defined in claim 1, wherein the at least one intermediate rail includes a circular rail encircling the core dilution passageway.

10. The combustor as defined in claim 1, further comprising a plurality of effusion holes defined in the heat shield and in fluid communication with the sub-chamber; and wherein a combined surface area of the effusion holes is smaller than a combined surface area of the impingement holes.

11. The combustor as defined in claim 1, wherein the heat shield is a heat shield panel, the peripheral area accounting for less than 50% of a surface of the heat shield panel.

12. The combustor as defined in claim 1, wherein the outlet of the peripheral dilution passageway is one of tangent and perpendicular to the core dilution passageway.

13. The combustor as defined in claim 1, wherein the at least one intermediate rail substantially seals the sub-chamber from the remainder of the air gap.

14. A gas turbine engine, comprising:
a combustor including:
   a combustor shell which includes a protuberance away from an inner heat shield, the protuberance having a first dilution hole defined therein;
   the heat shield mounted to the combustor shell and spaced-apart from the combustor shell to define an air gap therebetween, the heat shield has an outer surface facing the combustor shell and circumferentially surrounding a combustion zone relative to a central axis of the combustor, and an opposite inner surface facing the combustion zone, the heat shield having a second dilution hole defined therein, the second dilution hole is axially and circumferentially aligned with the first dilution hole relative to the central axis, a diameter of the first dilution hole being smaller than a diameter of the second dilution hole, a boss encompassing the second dilution hole and extending from the outer surface of the heat shield to an outer end spaced from the heat shield;
   a core dilution passageway extending through the first dilution hole of the combustor shell and the second dilution hole of the heat shield;
   a sub-chamber disposed within the air gap in fluid communication with the core dilution passageway, the sub-chamber being separated from a remainder of the air gap by at least one intermediate rail projecting across the air gap and forming an outer boundary of the sub-chamber and of a peripheral area of the core dilution passageway, the boss forming an inner boundary of the of the sub-chamber;
   an annular peripheral dilution passageway defined between the combustor shell and the heat shield around the core dilution passageway and extending through the second dilution hole of the heat shield, the sub-chamber having an outlet between the outer end of the boss and the combustor shell protuberance which is upstream of an exit of the second dilution hole relative to a core dilution flow within the core dilution passageway such that a peripheral dilution flow exiting the sub-chamber outlet combines with the core dilution flow of the core dilution passageway to form a total dilution flow upstream of the exit of the second dilution hole relative to the core dilution flow within the core dilution passageway; and
   impingement holes formed through the combustor shell and in fluid communication with the sub-chamber and the remainder of the air gap, the impingement holes having at least an impingement jet path directed onto the outer surface of the heat shield within the sub-chamber.

15. A method of cooling an area surrounding the first dilution hole of the combustor of claim 1, the method comprising:
   flowing the peripheral dilution flow through the combustor shell to the sub-chamber that is pressurised in relation to the remainder of the air gap and around the boss, the peripheral dilution flow accounting for at least 5% of the total dilution flow; and
   merging the peripheral dilution flow with a core dilution flow of the dilution hole to form the total dilution flow.

16. The method defined in claim 15, wherein flowing the peripheral dilution flow comprises impinging cooling air against the outer surface of the heat shield in the sub-chamber, and then using said cooling air as the peripheral dilution flow.

17. The method defined in claim 15, wherein the peripheral dilution flow accounts for between 10 to 30% of the total dilution flow.

* * * * *